(12) United States Patent
Notaro et al.

(10) Patent No.: US 7,122,073 B1
(45) Date of Patent: Oct. 17, 2006

(54) LOW VOID ADSORPTION SYSTEMS AND USES THEREOF

(75) Inventors: Frank Notaro, Amherst, NY (US); Alan Barnard Stewart, Snyder, NY (US); Jeffert John Nowobilski, Orchard Park, NY (US); Guoming Zhong, Getzville, NY (US); Arun Acharya, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/664,390

(22) Filed: Sep. 18, 2000

(51) Int. Cl.
B01D 53/047 (2006.01)

(52) U.S. Cl. .............................. 96/143; 96/130; 96/131

(58) Field of Classification Search ................... 96/108, 96/130–133, 143, 144
See application file for complete search history.

(56) References Cited

U.S. PATENT DOCUMENTS

| | | | | |
|---|---|---|---|---|
| 2,626,675 A | * | 1/1953 | Maher ........................... | 96/144 |
| 4,194,892 A | | 3/1980 | Jones et al. ..................... | 55/58 |
| 4,354,859 A | | 10/1982 | Keller, II et al. ............... | 55/25 |
| 5,080,700 A | * | 1/1992 | Bergloff et al. ............. | 96/144 X |
| 5,538,544 A | | 7/1996 | Nowobilski et al. .......... | 96/152 |
| 5,672,196 A | * | 9/1997 | Acharya et al. ............ | 96/144 X |
| 5,759,236 A | * | 6/1998 | Bruck et al. ............... | 96/130 X |
| 5,759,242 A | | 6/1998 | Smolarek et al. ............. | 96/149 |
| RE35,913 E | * | 10/1998 | Hay et al. ................... | 96/143 X |
| 5,968,233 A | | 10/1999 | Rouge et al. ................... | 95/96 |
| 5,985,001 A | * | 11/1999 | Garrett et al. ............. | 96/130 X |
| 6,027,548 A | * | 2/2000 | Ackley et al. ............. | 96/144 X |
| 6,068,679 A | * | 5/2000 | Zheng ........................ | 96/144 X |
| 6,070,653 A | * | 6/2000 | Wingbro .................... | 96/143 X |

FOREIGN PATENT DOCUMENTS

| | | |
|---|---|---|
| EP | 0537597 | 4/1993 |
| EP | 0879630 A2 | 11/1998 |
| GB | 2329597 | 3/1999 |

OTHER PUBLICATIONS

Motoyuki Suzuki, et al., "Piston–Driven Ultra Rapid Pressure Swing Adsorption", *Adsorption 2*, 111–119 (1996).
Farooq, et al. "Numerical simulation of a parallel–passage piston–driven PSA unit" *Elsevier, Separation and Purification Technology* 13 (1998) 181–193.

* cited by examiner

*Primary Examiner*—Robert H. Spitzer
(74) *Attorney, Agent, or Firm*—Mary Raynor Jimenez (57) ABSTRACT

A low void pressure swing adsorption system wherein flow movement and pressure pulse are influenced from the same source comprised of at least one hermetically sealed vessel containing an adsorbent bed with an inlet coupled to the adsorbent bed by way of an inlet header and an outlet coupled to the adsorbent bed by way of an outlet header. Void volume of the inlet and outlet headers can be limited to less than 20% of the adsorbent bed volume, preferably to less than 10%, and most preferably to less than 5%, by mounting high pressure source(s) and/or low pressure sink (s) proximate to, or nearly proximate to, the adsorbent bed/vessel. Low void volumes and reduced cycle times may be achieved in all bed configurations, including flat header beds, segmented beds, and vertical beds. Radial beds may be configured so that the void volume of the inlet and outlet headers is less than 50% of the volume of the radial adsorbent bed, preferably to less than 20%, and most preferably to less than 10

15 Claims, 10 Drawing Sheets

Invention: Two Bed with Low Void

Figure 1. Prior Art: Conventional PSA

Figure 2a. Invention: Single Bed with Low Void

Figure 2b. Invention: Two Bed with Low Void

Figure 2c. Invention: Flat Header Bed with Closely Mounted High Pressure Sources and Low Pressure Sinks Figure 2d. Invention: Flat Header Bed with Distributed Valves

Figure 3. Radial Bed

Figure 4. Segmented Bed

Top view of a segmented vertical bed, different sections separated by dividers undergo different PSA process steps such as adsorption, desorption and equalization, etc.

Figure 5. Vertical Plate Bed

Figure 6 Representative Process Cycle

Figure 7 void influence on recovery and power

- Case A: Without the instant invention with large void volume as shown in Figure 1 but with fast cycle time (~2s), low recovery and high power.
- Case B: The instant invention, reduced distribution pipe void volume as shown in Figure 2b.
- Case C: The instant invention, flat header as shown in Figure 2d.

2-Bed system, high and low pressures are 1.5 and 0.3 bars, O2 purity is 90%, cycle time is about 1~2s.

LOW VOID ADSORPTION SYSTEMS AND USES THEREOF

FIELD OF THE INVENTION

The present invention provides an improved pressure swing adsorption system, and, more particularly, a fast pressure swing adsorption system with low void volume, improved flow distribution, and enhanced process performance.

BACKGROUND OF THE INVENTION

Adsorption processes have been widely used for the separation and purification of gases. In recent years, pressure swing adsorption (PSA) systems including vacuum PSA (VPSA) have been developed for enhanced gas separation operations, particularly for the commercial production of oxygen and/or nitrogen from air. The PSA process consists of basic steps such as adsorption-desorption. Air or another gas mixture is fed into the system, which includes one or more vessels, each with an adsorbent bed, to an upper adsorption pressure. The adsorbent beds (a.k.a. adsorbers) selectively adsorb the more readily adsorbable component(s) of the air or gas mixture. The less readily adsorbable component(s) passes through the adsorber. The vessel is then depressurized to a lower desorption pressure for the desorption of the more readily adsorbable component(s) from the adsorber(s), which is then repressurized to the upper adsorption pressure as cyclic operation is continued.

In order to improve performance, conventional PSA systems typically use two or more vessels in parallel with directional valves to connect the vessels in alternating sequence to the compressor or vacuum pump. Further, to fully utilize the adsorbent material employed, PSA systems require uniform flow of gas across the adsorbent vessel(s) throughout the PSA processing cycle. In addition, void volume and pressure drops in the PSA vessel entrance and exit regions (i.e., the inlets and outlets and their associated headers) have adverse effects on the process performance of a PSA system and must be minimized in practical commercial operations. Ruthven, et al. disclose a method for estimating the magnitude of effects by void volume via an equilibrium model. More specifically, they examined the effects of void volume in a simple four-step cycle with a linear isotherm, and showed that large void volume could significantly reduce recovery. Unfortunately, the study applies to an idealized situation without consideration of mass transfer resistance, heat effect and isotherm non-linearity. In addition, only production end void volume and a simple cycle are investigated. U.S. Pat. No. 5,968,233 to Rouge, et al. discloses a similar conclusion of void effects for a more realistic air separation cycle. However, the patent focuses only on production end void volume. More importantly, the patent looks for an optimum void volume for oxygen cost, rather than a minimum void volume.

The effect of void volume varies depending on the location of the void (relative to the adsorbent) and on which step of the cycle the void is considered. For example, the light product gas in the production end void space serves, to some extent, as a purge gas during a countercurrent regeneration step; however, this purge is less effective than a controlled purge at low pressure. Also, the gas and compression work in both the production and feed end voids can be partially recovered during an equalization step. However, the losses of compressed gas and work during regeneration can be significant. In general, lower void volume ratio results in improved process performance (i.e., improved recovery, power consumption, etc. without considering flow distribution requirements and increasing fabrication costs).

Conventional methods for reducing PSA void spaces and improving process performance typically falls into the following classes: (a) vessel system with improved headers, (b) single-vessel system, and (c) piston-driven PSA system.

Vessel system design is a classic approach, focusing only on the vessel or bed itself. Vessels are designed to improve flow distribution and minimize void spaces within the vessel ends (or headers) between the gas inlet (feed end) or outlet (production end) and the adsorbent. U.S. Pat. No. 5,759,242 to Smolarek, et al., which describes a radial adsorber, and U.S. Pat. No. 5,538,544 to Nowobilski, et al., which describes a conventional vertical adsorber, are two recent examples of this approach. However, the vessel design approach has its limits for reducing void space. With a given flow distributor, it can only decrease header space to a level where flow maldistribution and pressure drop are acceptable for the process. In addition, void spaces in distribution pipes are not addressed by this approach.

The single-vessel pressure swing adsorption system disclosed in U.S. Pat. No. 4,194,892 to Jones, et al., is a rapid pressure swing adsorption (RPSA) system, which utilizes a single vessel filled with small adsorbent particles as well as very short cycle times (as short as a few seconds). It is worth noting that U.S. Pat. No. 4,194,892's primary purpose is not to reduce void space, but instead to reduce cycle time and adsorbent inventory and to eliminate multiple vessels. However, the use of a single bed can theoretically eliminate the distribution pipes (and then their voids) connecting a compressor or vacuum pump to different vessels in a multiple vessel PSA. The disadvantages of the single bed PSA are: (1) void space in the vessel header is not addressed and (2) product recovery is limited (in comparison to multiple vessel PSA) without an additional storage tank and recycle component.

U.S. Pat. No. 4,354,859 to Keller, et al. teaches a pressure swing parametric pumping process. This system, called a piston-driven PSA system, uses two synchronized pistons to pressurize and depressurize a single adsorber that is fed near the center of the adsorbent bed. Farooq, et al., Separation and Purification Technology 13 (1998) 181, applied this approach to a parallel passage adsorber for nitrogen and carbon dioxide separation. Suzuki, et al., Adsorption 2 (1996) 111 also utilized this approach in a single piston system for oxygen enrichment from air. This approach can theoretically eliminate header void spaces associated with conventional PSA systems. Moreover, there is no need for valves because flows can be controlled by the piston movement. However, the piston-driven PSA system suffers from scale-up difficulties. For instance, a very large piston is normally required for a large production unit. A piston of this size would be difficult to manufacture. Also, like the single bed PSA, the piston driven PSA suffers from low recovery in comparison to a conventional multiple vessel PSA.

Illustratively, European Patent Application 0,879,630 A2 to Garrett and La Cava extends the piston-driven PSA concept to a system with two sets of pistons or diaphragms. A first set of pistons or diaphragms is located at the top and bottom of the bed to influence fluid flow, as well as a second set of pistons or diaphragms at the side walls of the adsorber. The second set fractionally increases and decreases bed pressure prior to the adsorption and desorption steps, respectively. The Garrett and La Cava patent application teaches that using two sets is more efficient than only using one set.

Nonetheless, as acknowledged by Garrett and LaCava, its recovery is low. In addition, the second set of pistons or diaphragms complicates the process.

The present invention addresses the limitations of conventional vessel designs, single vessel PSA, and piston-driven PSA systems. The present invention not only minimizes the header void spaces within each vessel, but also improves distribution pipe void spaces between the compressor/vacuum pump and each vessel. Moreover, the present invention can use multiple compressors and/or vacuum pumps to better distribute flow and further reduce the void spaces.

SUMMARY OF THE INVENTION

The present invention provides a novel PSA system and process with low void volume (also called "void spaces") and improved flow distribution that is adequate for fast cycle processes. This system can also be adapted for use in combined piston-driven and conventional multi-bed PSA systems as well as in bed-to-bed interactions.

Figure 2A:
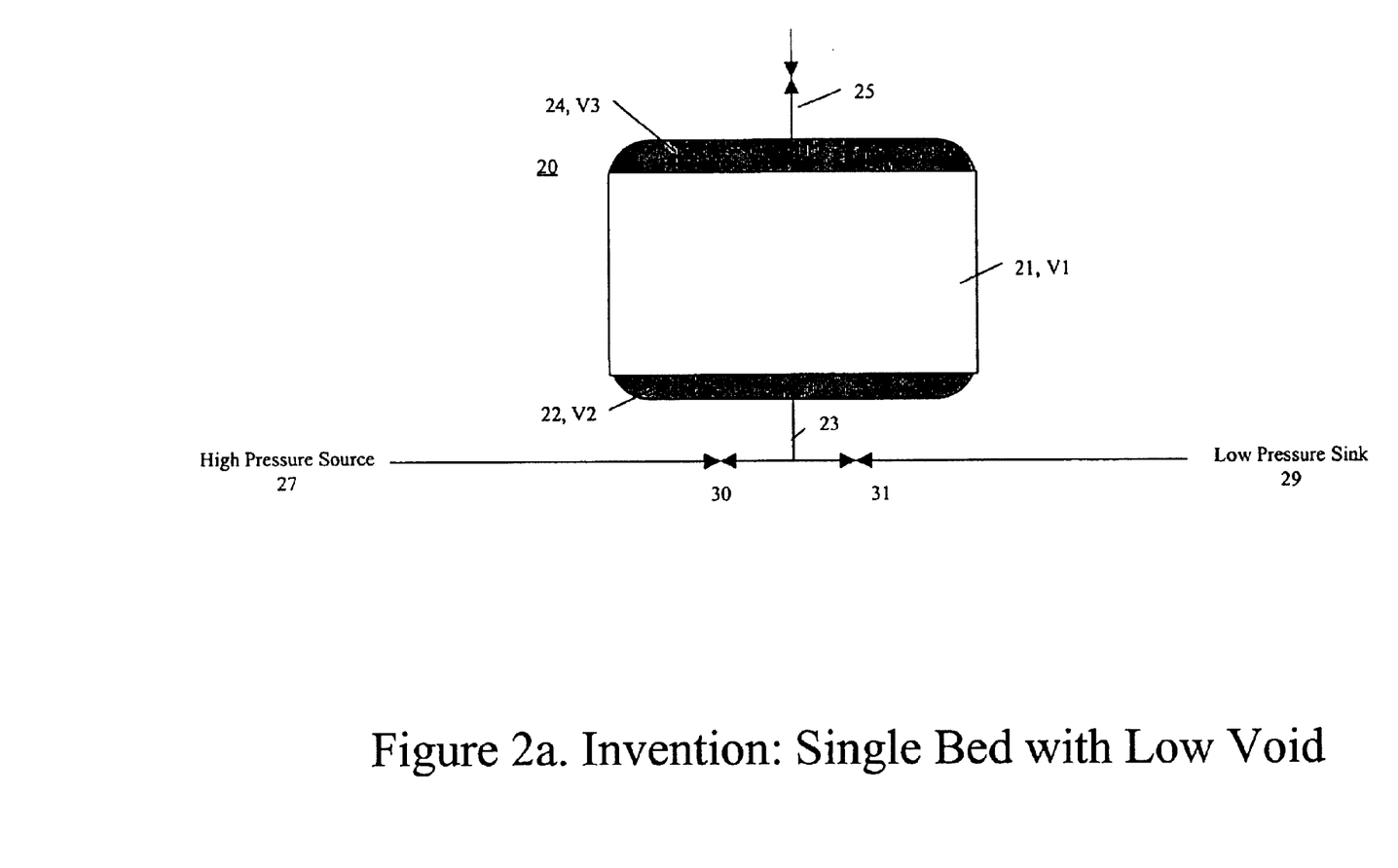
FIG. 2a is a schematic depicting a single bed system with low void space. This schematic shows a single bed with a high pressure source and a low pressure sink coupled to said bed.
Figure 2B:
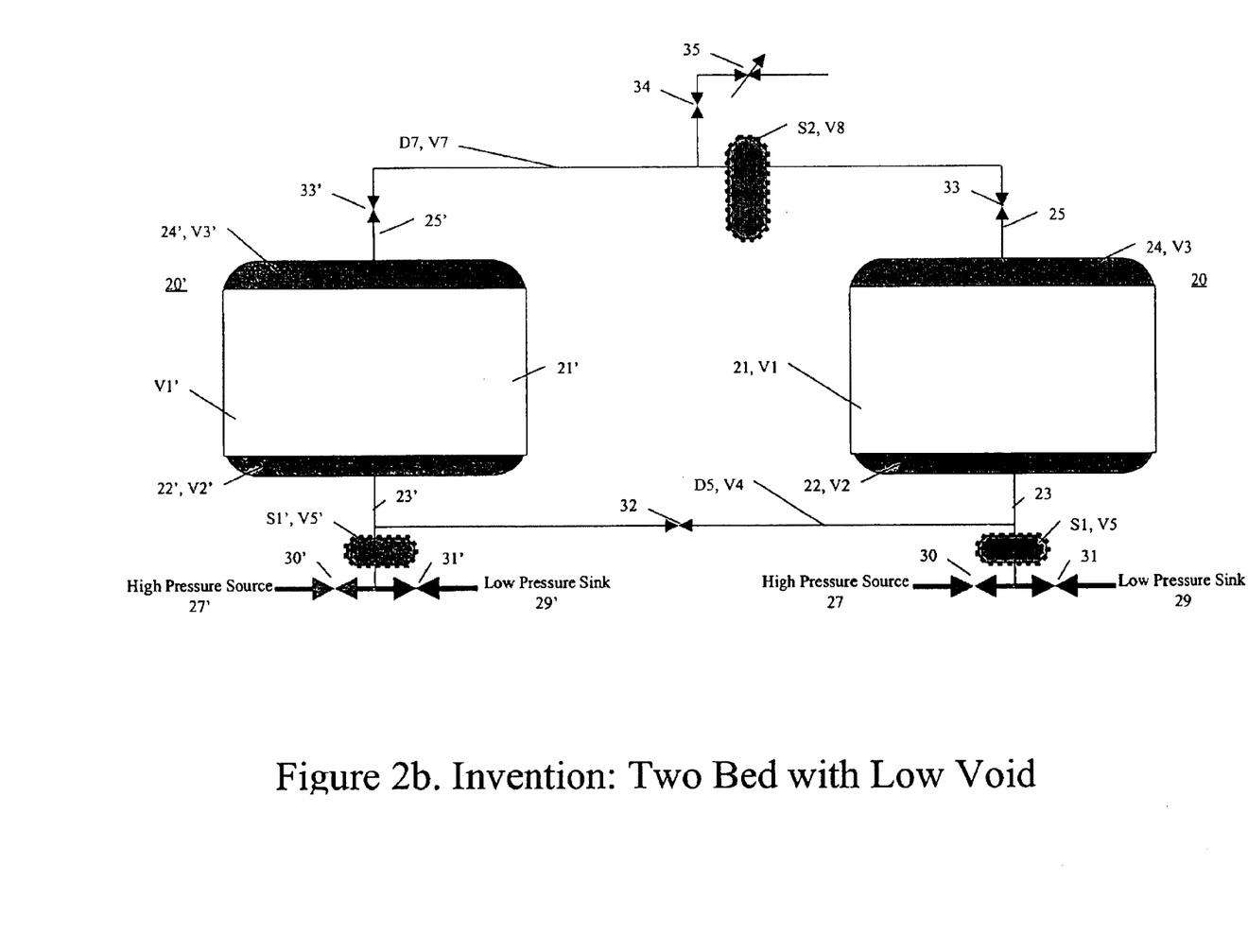
FIG. 2b is a schematic depicting a two bed system with low void space.

In one embodiment of the present invention, a low pressure swing adsorption system is taught wherein flow movement and pressure pulse are influenced from the same pressure source. The pressure source may be a high pressure source or a low pressure sink. The system includes at least one vessel containing an adsorbent bed. An inlet (feed end) is coupled to the vessel by way of an inlet header and an outlet (production end) is coupled to the vessel by way of an outlet header. The inlet header and the outlet header of each vessel have a combined volume of less than approximately 20% of the volume of the adsorbent bed. Preferably, this volume is limited to less ton 10% and most preferably to less than 5%. Each inlet is coupled to a high pressure source or a low pressure sink. This configuration is depicted in FIGS. 2a and 2b, discussed in detail below. It is notable that void volumes of less than about 20% of the adsorbent bed can be achieved in nearly all bed configurations except radial bed configurations. One skilled in the art would acknowledge that void volumes this low are not readily realized in radial bed configurations. For radial beds, the present invention can achieve void volumes of less than 50%.

Figure 2C:
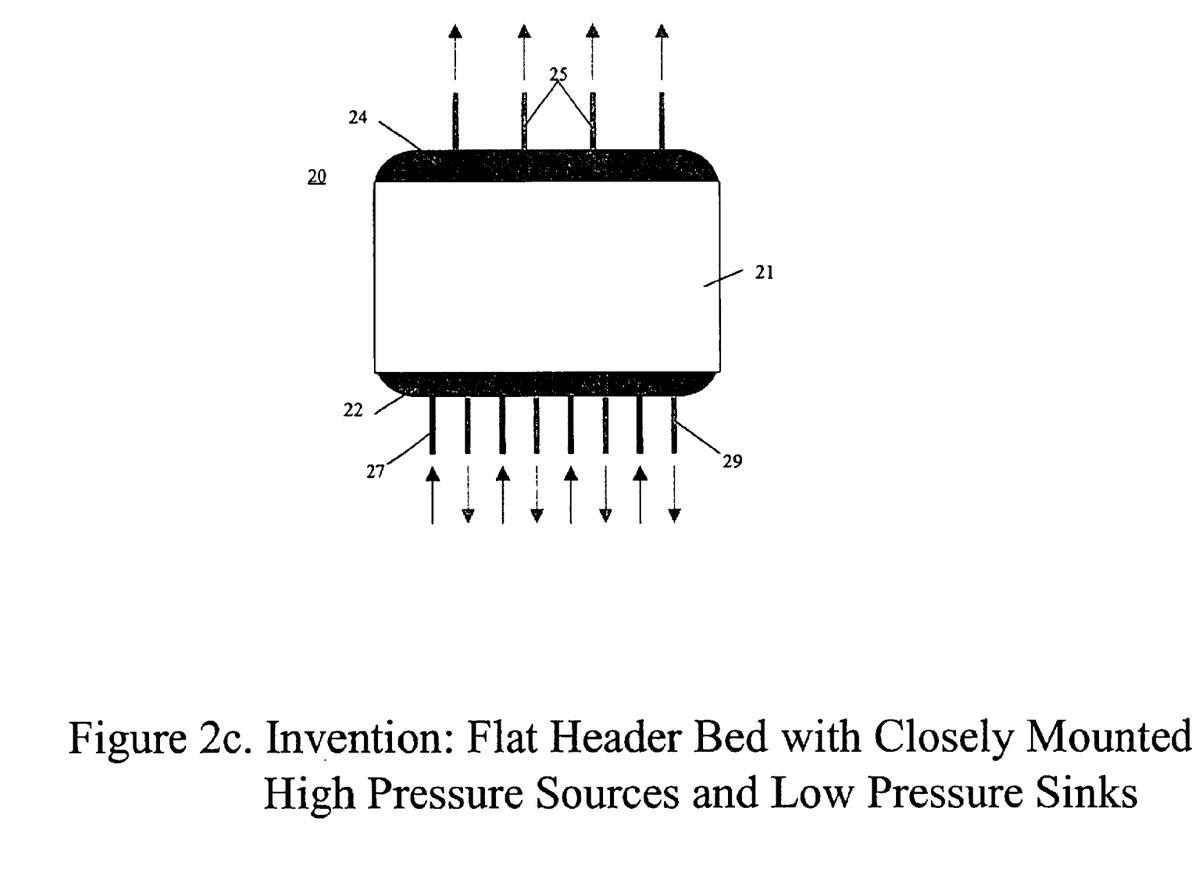
FIG. 2c is a schematic depicting a flat header bed with closely mounted compressors and/or vacuum pumps.

In a second embodiment, depicted in FIG. 2c, each vessel has an adsorbent bed with an inlet header and an outlet header. Each vessel has at least one outlet and more than one inlet. Mounted proximate to each inlet is a high pressure source or a low pressure sink. As in the first embodiment, the total volume of the inlet and outlet headers of each vessel is limited to less than approximately 20% of the volume of the adsorbent bed of that vessel. More preferably, this volume is less than 10% and most preferably less than 5%.

Figure 2D:
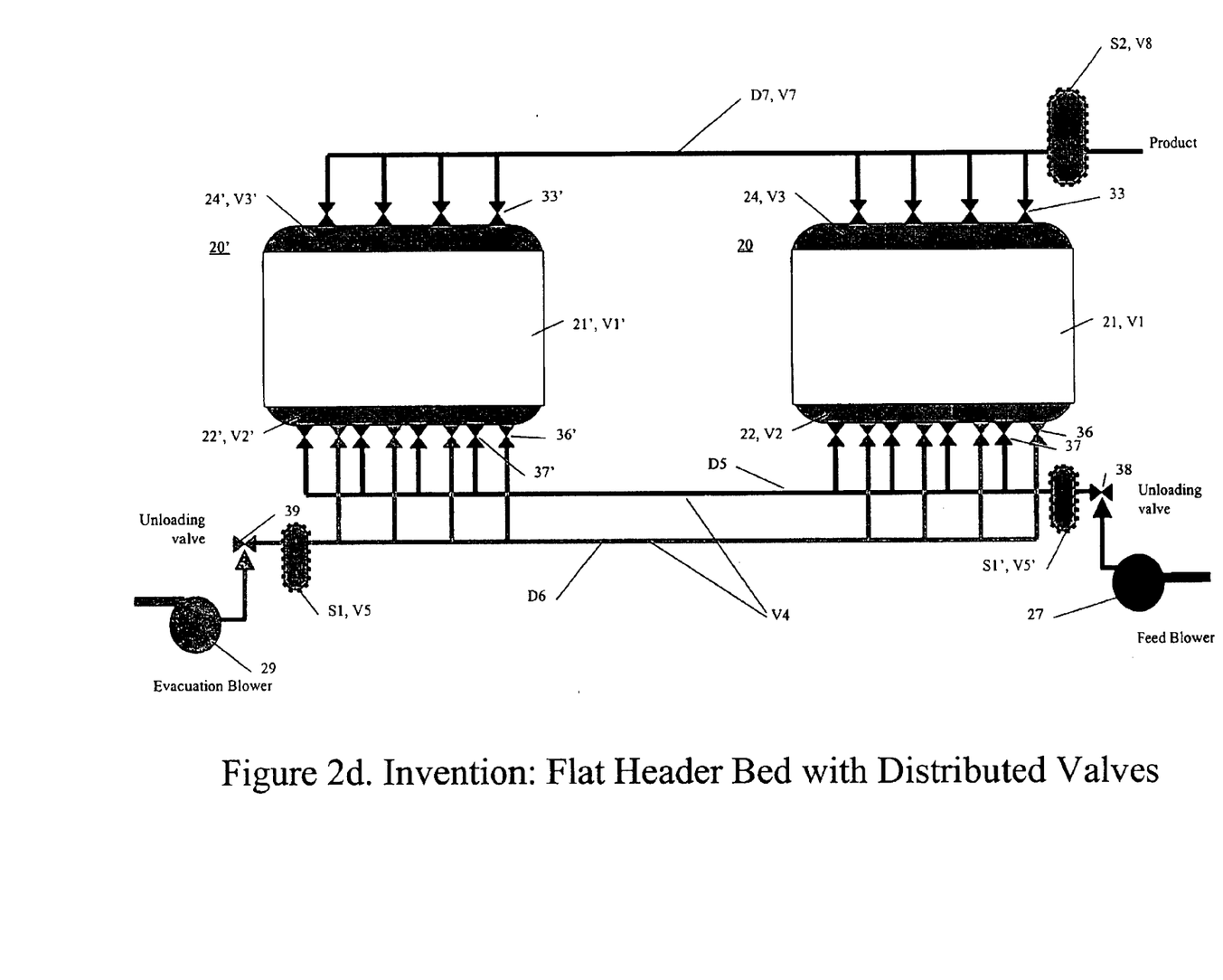
FIG. 2d is a schematic depicting a flat header bed in which inlet valves are mounted proximate to the inlet header. These inlet valves share a common high pressure source or low pressure sink.

In a third and most preferred embodiment, as depicted in FIG. 2d, each vessel has an adsorbent bed, an outlet header and an inlet header. Further, each vessel has at least one outlet and more than one inlet. Each inlet is coupled to a valve mounted proximate to said vessel. All valves share a common high pressure source and/or low pressure sink. Again, the total volume of the inlet and outlet headers of each vessel is limited to less than approximately 20% of the volume of the adsorbent bed of that vessel. More preferably, this volume is less than 10% and most preferably less than 5%. To increase the efficiency of this embodiment distribution pipes connecting in the inlet valves to the high pressure source or low pressure sink should be maintained at high or low pressures, respectively. The total volume of the distribution pipes may also be limited to less than approximately 10% of the total volume of the adsorbent bed(s).

All void volume situated between the inlet and pressure source may be collectively referred to as feed end intermediary volume. This feed end intermediary volume is depicted in the figures as S1, S1', V5, V5' and V4. While silencers are depicted in the figures, the void source may be any system components and their associated volumes situated between the inlet and the pressure source and subjected to pressure changes. Thus, the term "intermediary volume" may include pipes, silencers, tanks, or any other void source that happens to be located in this area. In accordance with the present invention, this intermediary void volume may be limited to less than 15–20% of the total volume of the adsorbent bed(s).

The adsorbent bed(s) may be configured radially, vertically or, most preferably, configured as a flat header bed. In addition, the high pressure source may be of any type known to those skilled in the art; however, a compressor is preferable, such as a conventional Roots type compressor or a linear compressor (i.e., a piston compressor driven by a linear motor). The present invention may be employed wherein the piston compressor is comprised of more than one piston.

A low pressure sink may be used in conjunction with, or as an alternative to, the high pressure source described above. Any low pressure sink may be employed in the system of the present invention; however, a vacuum pump is preferred.

One object of the present invention is to reduce the void volume in both the feed end (inlet) and the production end (outlet) for fast PSA processes with reduced cycle time. A further object of the present invention is to provide a system with improved product gas production and improved adsorbent utilization. Another object of the present invention is to provide a system with reduced intermediary volume relative to the adsorbent bed(s) volume. Yet a further object is to present an efficient low void adsorption system that can be readily adaptable to single or multiple bed configurations as well as various bed configurations. Other features and advantages of the present invention will be apparent from the following detailed description and when read in conjunction with the accompanying drawings.

BRIEF DESCRIPTION OF THE DRAWINGS

FIG. 3a is a top view of this radial bed while FIG. 3b is a side view of the radial bed.

DETAILED DESCRIPTION OF THE INVENTION

The present invention provides a pressure swing adsorption (PSA) system with a low void volume and enhanced process performance in which the void space in the inlet and outlet headers, the feed and vacuum distribution pipes and silencers is limited. In the disclosed embodiments, pressure sources, such as high pressure sources and/or low pressure sinks, are mounted proximate to, or nearly proximate to, the vessels. The present invention may suitably employ multiple inlets and/or multiple outlets to improve flow distribution and further decrease void volume.

Throughout this document, the terms "inlet" and "feed end" are used interchangeably and are intended to carry essentially the same meaning. Likewise, the terms "outlet" and "production end" are used interchangeably and are intended to carry essentially the same meaning.

Besides enhanced adsorption, the present invention results in a system with fast cycle times as compared with conventional PSA system performance. Using short cycles times may reduce adsorbent inventory, make PSA systems more compact, and increase productivity. This feature is especially important for medical applications such as oxygen concentrators. Therefore, decreasing cycle time has become a central point in PSA development. The present invention reduces the conventional 30 second cycle time by an order of magnitude.

The present invention has at least four advantages in low void volume, flow distribution and process performance as compared with the systems taught in the prior art. First, those skilled in the art understand that distribution pipes (also called feed distribution pipes and vacuum distribution pipes) connecting high pressure sources and/or low pressure sinks to the vessel contribute to total void space, thereby reducing the efficiency of the system. The present invention discloses that these high pressure sources and/or low pressure sinks can be mounted proximate to, or nearly proximate to, the vessels, thereby eliminating the need for these feed and vacuum distribution pipes and their associated volume. Likewise, silencers contribute to total void space and may be reduced or eliminated as disclosed in the present invention to reduce void space and improve system efficiency. On this basis, significant void volume reduction and process performance improvement are achieved in comparison with a conventional multi-bed PSA.

Second, more than one high pressure source and/or low pressure sink may be mounted proximate to, or nearly proximate to, each vessel, by suitably employing multiple inlets and/or outlets. These inlets and outlets improve flow distribution within the adsorbent bed headers and reduce header void space. For example, the ratio of the volume of the void space to the volume of the adsorbent bed is minimized. The resultant system has a reduced total void space as compared with the PSA systems taught in the prior art.

Third, the configuration taught herein removes the scale-up difficulties associated with Suzuki, et al.'s piston-driven system. Under the present invention, a series of smaller pistons may be suitably employed to replace one large piston, by using the multiple feeds.

Fourth, multi-beds and bed-to-bed interactions may be suitably employed to improve overall performance.

Figure 1:
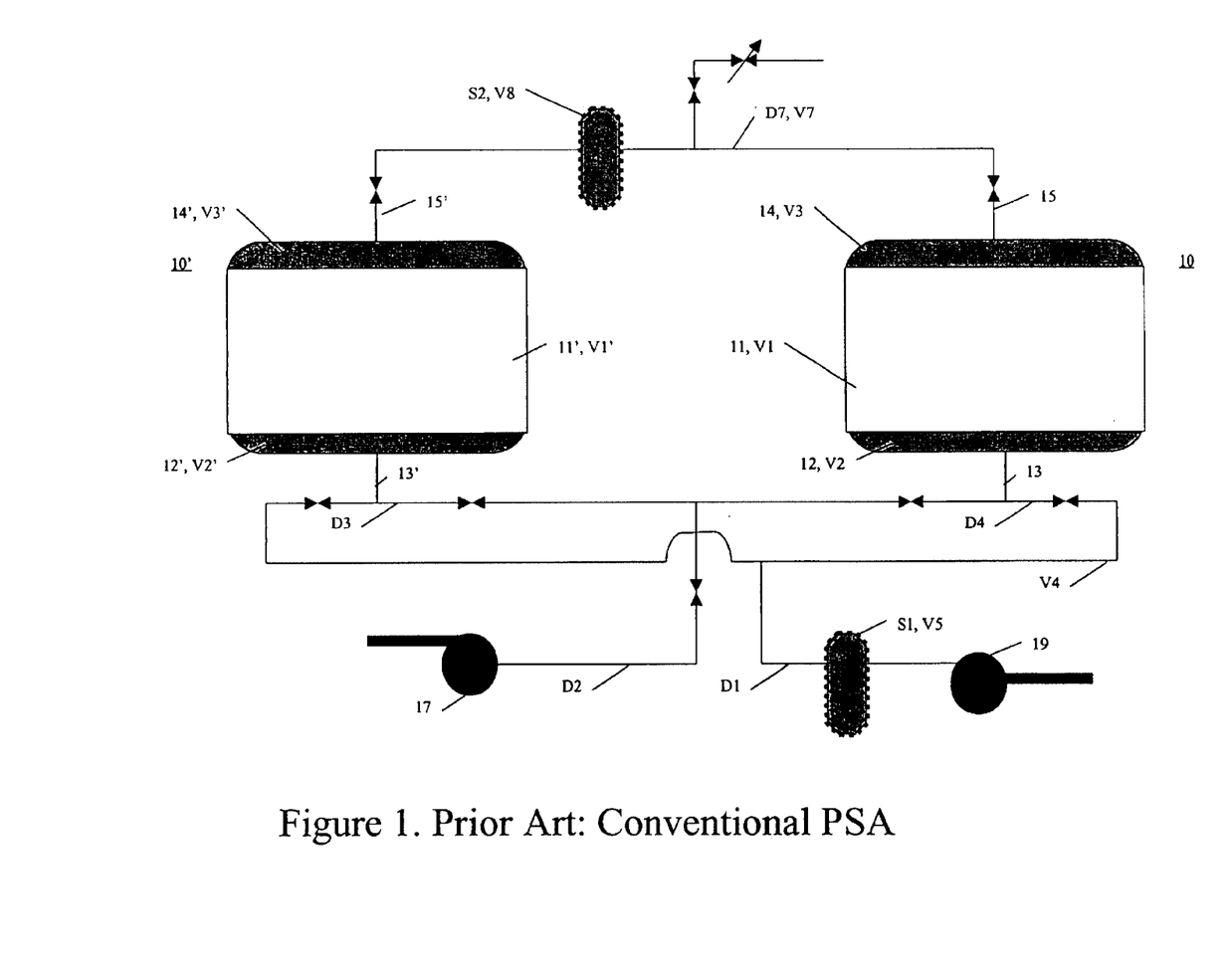
FIG. 1 is a schematic depicting a conventional PSA.

FIG. 1 represents a PSA system equivalent to that taught in the prior art. These systems tend to have large distribution pipe volumes, large header volumes and large cycle times (approximately 30 seconds). A configuration with two vertical vessels 10 and 10' each with an adsorbent bed 11 and 11' with volumes V1 and V1', respectively, is chosen for illustration purposes only and is intended to be a non-limiting representative example. The configuration of FIG. 1 also includes inlets 13 and 13' connected to the adsorbent bed by way of inlet headers 12 and 12', outlets 15 and 15' connected to the adsorbent beds by way of outlet headers 14 and 14', a low pressure sink 17, and a high pressure source 19. Inlet headers 12 and 12' have volumes V2 and V2', respectively. Outlet headers 14 and 14' have volumes V3 and V3'. A conventional system typically consists of the following void spaces:

1) Headers—Inlet headers 12 and 12' and outlet headers 14 and 14' represent void space. In the case of a conventional vertical adsorbent bed configuration, the inlet and outlet headers comprise a void space equivalent to approximately 16 to 20% of the volume of the adsorbent bed. In the case of radial beds, the inlet and outlet headers have a void space equivalent to approximately 20 to 60% of the volume of the adsorbent bed.

2) Distribution Pipes—Distribution pipes D1, D2, D3 and D4 connect the high pressure source to the adsorbent beds (feed distribution pipes) and connect the low pressure sink to the adsorbent beds (vacuum distribution pipes), collectively referred to as "feed end pipe volume." Total volume of the feed end (inlet) pipes equals V4. Distribution pipe D7 connects the production tanks to the adsorbent bed. The volume of the production end (outlet) distribution pipes D7 is referred to collectively as V7. These pipes represent void space of approximately equal to 5 to 10% of the volume of the adsorbent bed.

3) Silencer—Silencer S1 with volume V5, such as a tank positioned between the high pressure source or low pressure sink and the adsorbent bed, also represents void space. Further, such tanks S2 with volume V8 may be situated on the production end. Typically, these silencers have a void space equivalent to approximately 5 to 10% of the volume of the adsorbent bed.

The total void space volume is the sum of these three void spaces. There is a large amount of irreversible work present in these void spaces due to pressure changes in the PSA process, representing a significant loss of power and process performance. This power loss increases with an increase in the ratio of high to low pressure.

Further, product gases remained trapped in these voids upon saturation of the adsorbent bed and are lost during regeneration of the adsorbent bed. Therefore, larger void spaces represent lost product.

In accordance with the present invention, systems within the following void space parameters may be developed by mounting high pressure sources and/or low pressure sinks proximate to, or nearly proximate to, the adsorbent bed typically in-line with fluid flow through the adsorbent bed so that pressure pulse and flow movement are influenced from the same pressure source.

$$20\% \geq \frac{\text{volume of the inlet headers } (V2 + V2') + \text{volume of the outlet headers } (V3 + V3')}{\text{volume of the adsorbent beds } (V1 + V1')}$$

$$10\% \geq \frac{\text{volume of the distribution pipes } (V4 + V7)}{\text{volume of the adsorbent beds } (V1 + V1')}$$

$$10\% \geq \frac{\text{volume of the silencers } (V5 + V5' + V8)}{\text{volume of the adsorbent beds } (V1 + V1')}$$

The present invention also discloses that the total void space of silencers, tanks, pipes and other various sources of void space located between the inlet and the pressure sources may likewise be limited to about 20% of the adsorbent volume.

Note that in the case of radial bed configurations, header void space tends to be generally larger. Therefore, for radial beds, equation (1) is modified to:

$$50\% \geq \frac{\text{volume of the inlet headers } (V2 + V2') + \text{volume of the outlet headers } (V3 + V3')}{\text{volume of the adsorbent beds } (V1 + V1')}$$

Mounting the high pressure source and low pressure sink proximate to, or nearly proximate to, the vessel allows for less distribution pipe volumes, thereby reducing total void space.

In conventional systems, bed fluidization, pressure drop, and compressor capacity typically limit flow rate. One conventional method to increase productivity includes reducing the bed length and increasing the cross-sectional area of the bed. However, shorter bed lengths and larger bed diameters often result in a higher ratio of the void volume relative to the adsorbent bed volume. For instance, the total void volume ratio of a conventional axial-bed PSA system is about 30%, and the process cycle time is about 30 seconds. Reduction of the cycle time by 50% (i.e., from 30 seconds to 15 seconds) by cutting the bed length by 50%, approximately doubles the total void volume ratio (i.e., from 30% to 60%) since the inlet (feed end) and outlet (production end) void volumes remain the same. The increased void volume ratio dramatically decreases the process performance. Therefore, the void volume reduction is a key for fast PSA system developments.

FIG. 2a illustrates one non-limiting embodiment of the present invention using a single vertical bed. A vessel 20 has an adsorbent bed 21 (with volume V1) with an inlet 23 coupled thereto by way of an inlet header 22 (with volume V2). The inlet 23 draws feed gases or feed gas mixtures to the adsorbent bed 21 for purification or other treatment. Likewise, an outlet 25 is coupled to said adsorbent bed 21 by way of an outlet header 24 (with volume V3). The outlet 25 provides processed gases also called product gases. Connected to each vessel via the inlet header is a high pressure source 27 or low pressure sink 29. These sources 27 or sinks 29 may be coupled to the vessel 20 in a variety of ways; however, FIG. 2a depicts valves 30 and 31 coupling the sources 27 or sinks 29 to the vessel 20. Although FIG. 2a depicts both a high pressure source 27 and a low pressure sink 29, these sources and sinks may be used in the alternative or in concert.

The vessel is typically filled with an adsorbent suitable to the product desired, such as a nitrogen selective adsorbent that produces an oxygen product. The high pressure source may be any type of compressor, such as a conventional Roots type or linear compressor. The linear compressor is a piston compressor driven by a linear motor. These types of linear compressors have a higher efficiency and improved performance. In addition, it is easy to modulate capacity or flow with piston compressors; such a feature is very useful in medical concentrators. Furthermore, linear compressors may be modified to operate as a vacuum pump. The low pressure sink may be of any configuration, suitable to the system, however, a vacuum pump is preferred. The high pressure source and low pressure sink may be used in the alternative or in concert.

FIG. 2b depicts a two-bed embodiment of the present invention. This embodiment contains two vessels 20 and 20' each with an adsorbent bed 21 and 21' (with volumes V1 and V1', respectively), an inlet header 22 and 22' (with volumes V2 and V2', respectively), an inlet 23 and 23', an outlet header 24 and 24' (with volumes V3 and V3', respectively), an outlet 25 and 25', and either a high pressure source 27 and 27' or a low pressure sink 29 and 29'. The high pressure source and low pressure sink may be used in the alternative or in concert. Note that pipe D5 (with volume V4) and valve 32 are used for inlet-inlet equalization between the two vessels, if necessary. Distribution pipe D7 on the production (outlet) end of the system has volume V7. Any combination or mixture of high pressure source(s) or low pressure sink(s) are acceptable. Further, although two beds/vessels are shown, any number of beds/vessels may be suitably employed.

Also depicted in FIG. 2b are silencers S1, S1', and S2 having volumes V5, V5', and V8, respectively. These silencers are intended to represent all void sources, such as silencers, tanks, pipes, etc., situated between the inlet and the pressure source. Those skilled in the art would recognize that various void sources, not solely silencers, may be situated in the system. These silencer volumes V5, V5,', and V8, distribution pipe volumes V4 and V7, and other void volume sources V6 (not shown) are collectively referred to as intermediary volumes V10 (not shown) and may be limited in accordance with the present invention. These volumes may be limited to less than approximately 15–20% of the total adsorbent bed volume.

FIG. 2c shows yet another non-limiting embodiment of the present invention using a flat header bed with closely mounted compressors and/or vacuum pumps. In this embodiment the high pressure source(s) 27 and low pressure sink(s) 29 are mounted immediately proximate to the inlet header 22 of the adsorbent bed 21. In such a configuration, at least one outlet 25 is coupled to the outlet header 24 of vessel 20.

Since the separation work in a PSA process is only done in the adsorbent, the rest of the void (i.e., non-adsorbent) volumes, such as distribution pipes and adsorber headers, must be minimized for improved process performance. In conventional bed headers, a single inlet or outlet is normally used. A certain volume is needed for distributing gas flows from the inlet or outlet uniformly to the adsorbent for better use of the adsorbent and process performance. Multiple inlets or outlets can provide a better flow distribution and require less header volume. The number of inlets or outlets depends on a number of factors, for example, product flow, diameter/size of the bed, high pressure source/low pressure sink capacity, etc. If enough inlets or outlets are provided, the flow distribution header volume could be virtually eliminated and a quasi-flat header could be obtained as illustrated in FIG. 2c. Compared with a conventional header, the flat header design can save up to 15–20% (and in some instances 5–10%) of the volume of a vertical bed configuration of a 150 TDP oxygen plant, and approximately 20–60% (and in some instances 10–20%) for a radial bed.

FIG. 2d shows a further non-limiting embodiment of the present invention using two flat header adsorbent beds 21 and 21' (with volumes V1 and V1', respectively) are connected to a common high pressure source 27 (i.e., compressor) ard/or low pressure sink 29 (for example, a vacuum pump) by way of distributed valves. Valves 36, 36', 37 and 37'represent inlets and may be mounted immediately proximate to the inlet headers 22 and 22' (with volumes V2 and V2', respectively). Likewise, valves 33 and 33' represent outlets and may be coupled proximate to the outlet headers 24 and 24' (with volumes V3 and V3', respectively). Valves 36 and 36' are connected to common distnution pipes D6 and share a low pressure sink 29. Valves 37 and 37' are connected to common distribution pipes and share a high pressure source 27. As in the embodiment of FIG. 2d, ideally the distribution pipes D5 and D6 should be maintained at either high pressure or low pressure depending on whether they are connecting the high pressure source or low pressure sink, respectively, to the vessel. The valves can provide the multiple flow inlets and outlets required by a flat header, thereby reducing the header void volume. Three-way unloading valves (38 and 39) and distributed valves can be suitably employed to close the distribution pipes to pressure changes, for example during an idle step, and maintain either high or low pressure. Therefore, the distribution pipe volume (V4 and V7) does not contribute, or contributes little to, power loss and the total void volume. In this embodiment, one high pressure source and/or one low pressure sink may be sufficient for the entire system. Alternatively, multiple high pressure sources and/or low pressure sink may be employed.

Figure 3:
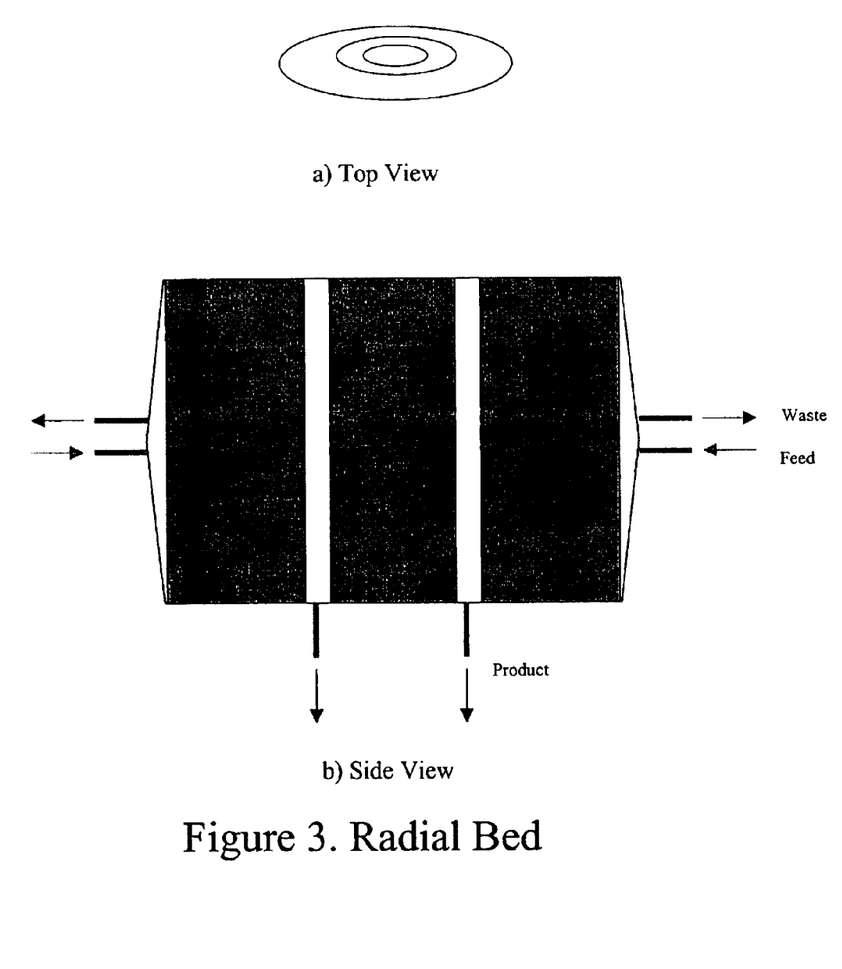
FIG. 3 is a schematic depicting a radial bed.
Figure 4:
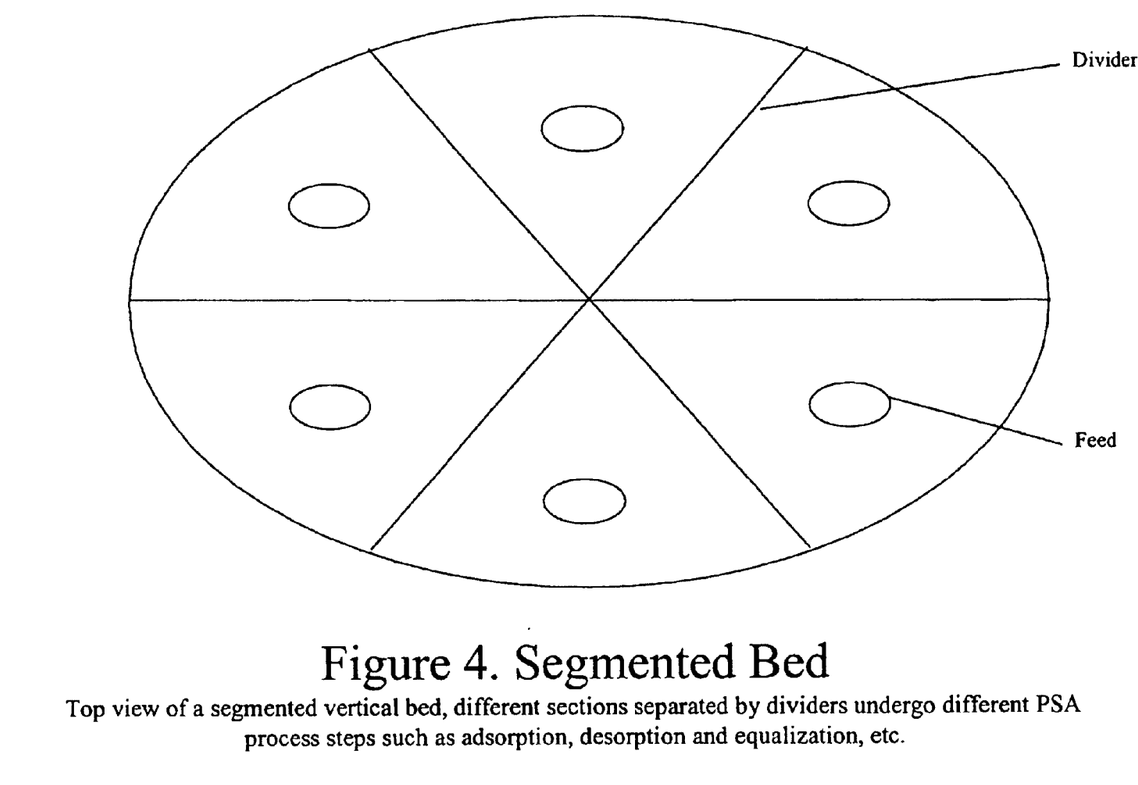
FIG. 4 is a schematic depicting the top view of a segmented vertical bed, different sections are separated by dividers which undergo different PSA process steps such as adsorption, desorption, and equalization, etc.
Figure 5:
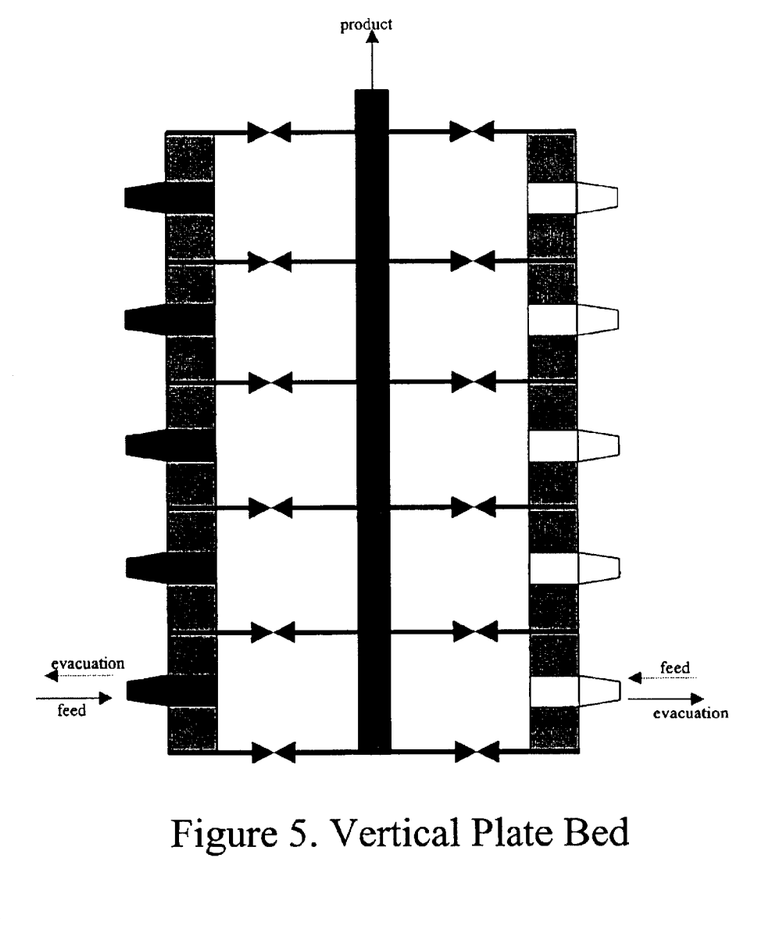
FIG. 5 is a schematic depicting a vertical plate bed.

FIG. 2d also depicts silencers S1, S1', and S2 with volumes V5, V5', and V8, respectively. These silencers contribute to intermediary volume V10 (not shown) along with distribution pipe volumes V4 and V7, and other miscellaneous volumnes V6 (not shown). As discussed above, V6 includes all volumes and not solely silencers, that may be situated between the inlet and the pressure source(s) or on the production (outlet) end. In accordance with the present invention, these void sources may be limited to less than 20–15% of the total volume of the total adsorbent bed volume. FIGS. 3a and 3b depict a radial bed configuration also suitable in the present invention. FIG. 3a depicts a top view of the bed and FIG. 3b depicts a side view. FIG. 3b shows a raial configuration where the high pressure source and/or low pressure sink, and valves are distributed along the circumference of the bed. In addition, the bed may be segmented (or divided, stuctured) as shown in FIG. 4. FIG. 4 depicts a segmented vertical adsorber configuration, wherein each segment functions as an individual adsorbent bed. Moreover, the beds may be very shallow and arranged in a parallel configuration where two adjacent beds (or compartments) share a common feed, evacuation and product withdrawal. The system can also be a vertical bed as shown in FIG. 5.

Figure 6:
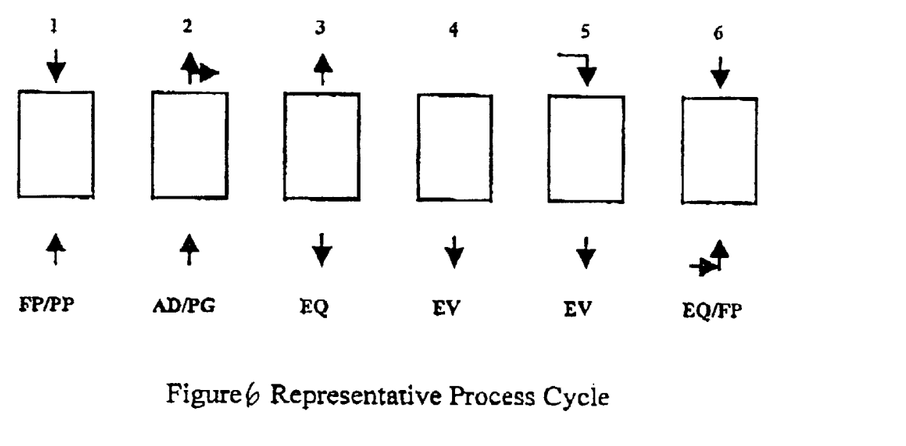
FIG. 6 is a schematic depicting a representative process cycle.

Any process cycle with basic adsorption and desorption steps may suitably employ the configurations disclosed herein to improve void volume and efficiency. A representative PSA cycle using two adsorbers is selected for illustrative purposes, as shown in FIG. 6. The cycle consists of the following steps:

Simultaneous feed and product pressurization (FP/PP)
Adsorption and purge (AD/PG)
Both end equalization (EQ)
Evacuation (EV)
Evacuation and purge (EV)
Equalization (EQ/FP)

Three overlapping steps are used in this cycle: simultaneous feed and product (FP/PP), dual end equalization (EQ), and simultaneous dual end equalization and feed. These overlapping steps create a continuous feed thereby reducing cycle time. During step 1 (FP/PP) shown in the process cycle of FIG. 6 and as shown in the two-bed system of FIG. 2b, air containing oxygen and nitrogen is compressed and sent to bed 21 through valve 30. At the same time, high pressure oxygen product is concurrently introduced to bed 21 through valves 33, 34, and 35. When the pressure in the bed reaches adsorption level, step 2 (AD/PG) starts. One portion of oxygen starts flowing from bed 21 through valves 33, 34 and 35 and collected as product. During all these times, bed 21' undergoes two evacuation steps (steps 4 and 5, EV) through valve 31'. When oxygen concentration leaving bed 21 is no longer acceptable, valve 34 is closed. Valve 31' is also closed while valves 30' and 32 are open and step 3 (EQ) starts for bed 21, while bed 21' undergoes step 6 (EQ/FP). When the pressures between the two beds are approximately equal, equalization steps (EQ and EQ/FP) are stopped and the second half of the cycle takes place wherein the steps are repeated. For example, bed 21' processes the air while bed 21 recharges, during which time valve 33' performs the same functions earlier performed by valve 33, valve 30' performs the same functions earlier performed by valve 30, and valve 31' performs the same functions earlier performed by valve 31.

Figure 7:
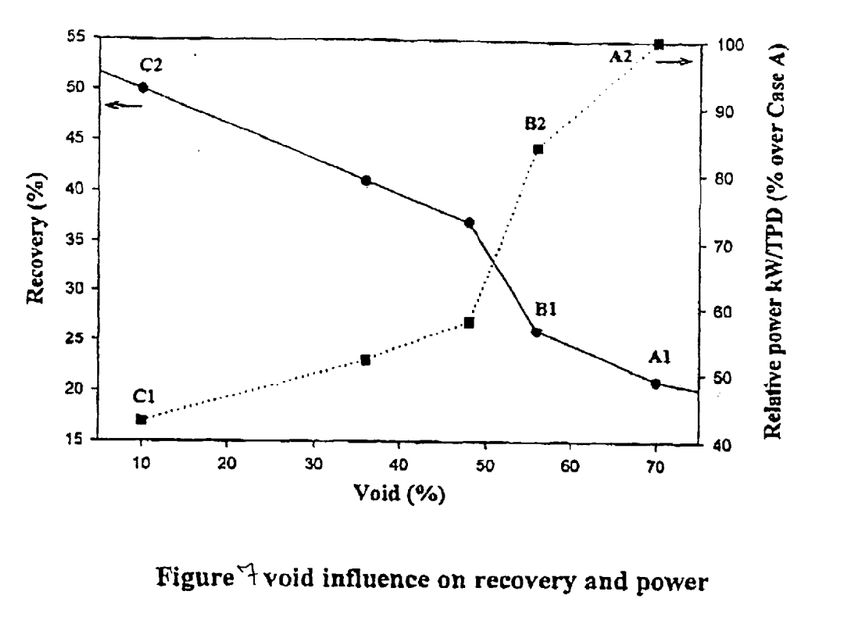
FIG. 7 is a graph depicting the void influence on recovery (solid line) and power (dotted line). Case A is the prior art (as shown in FIG. 1) but with a fast cycle time (approximately 2 seconds), low recovery and high power. Case B is the present invention with a reduced distribution pipe void volume as shown in FIG. 2b Case C is the present invention with a flat header as shown in FIG. 2d. The two-bed system has a high pressure equal to 1.5 bars and a low pressure equal to 0.3 bars, an $O_2$ purity equal to 90% and a cycle time equal to approximately 1 to 2 seconds.

The improvement in process performance as a result of the reduced void volume is illustrated in FIG. 7. A simple air separation process with different void volumes is simulated for this purpose. A highly exchanged LiX zeolite ($SiO_2$/$Al_2O_3$ ratio of between about 2.0 to 2.5) is chosen for adsorbent. The adsorbent particle size is kept constant for this comparison. The operating pressure ratio (adsorption/desorption) is about 5. The process performance is based on oxygen recovery wherein oxygen product purity is maintained at about 90%. The oxygen recovery is defined by the ratio of the oxygen in the product over the oxygen in the feed.

FIG. 7 illustrates the influence of the void volume on the performance of fast cycle processes. Given, for example, a conventional axial-bed PSA system (such as that shown in FIG. 1) with a cycle time of about 10 seconds and a void volume of about 14%. In order to reduce cycle time to 2 seconds, the bed length must be reduced to one-fifth of its original size. Such a reduction in bed length corresponds to a void volume increase of about 70%. With such a large void volume, oxygen recovery will decrease to about 20%, as indicated by case A1 of FIG. 7. Therefore, a conventional bed configuration cannot achieve fast cycle times without greatly compromising product recovery.

By contrast, using the configuration disclosed in the present invention, the distribution pipes can be avoided as in FIG. 2b, resulting in a reduction of the void volume to about 50%. Such a reduction increases recovery to about 25%, as indicated by case B1 in FIG. 7. Furthermore, in the present invention, if two flat headers are used as shown in FIGS. 2c and 2d, the void volume can be reduced to a few percent of the adsorbent bed, resulting in a recovery of more than 50%, as indicated by case C2 in FIG. 7. Thus, the present invention reduces cycle time while significantly improving recovery.

Similarly, the void volume has a very important effect on power consumption for fast cycle process because large amounts of power are generally lost in the voids. Simulations indicate that as compared with 70% void case A2, the present invention can reduce power by 16% in case B2 by eliminating the distribution void, and up to 50% in case C1 by using flat headers. It should be understood that the foregoing description is only illustrative of the invention. Various alternative and modifications can be devised by those skilled in the art without departing from the invention. Accordingly, the present invention is intended to embrace all such alternatives, modifications and variances which fall within the scope of the appended claims. More particularly, the system, although presented here with a one or two bed embodiment, can be practiced with more beds. Further, the invention is not restrcted to a single adsorbent. Multiple adsorbents can be employed. Also, adsorbents could be layered or mixed within a bed. The adsorbents should not be limited to nitrogen selective adsorbents mentioned above, other adsorbents can be employed as well. Although the process of the present invention is preferably operated near atmospheric pressures and ambient temperatures, it can be applied to a full range of process conditions, e.g.,pressures, temperature, and flow rate, etc.

Further, bed-to-bed equalizations or interactions are not limited to what is described in the present invention. Other arrangements can be used. When the bed is a segmented one, equalizations can be between segments. Furthermore, the present invention is not limited to the embodiments described herein, various other configurations may be suitable employed. In addition, the linear compressor is not limited to a piston compressor driven by a linear motor mentioned above. It can be a compressor driven by any electrical, magnetic or audio forces. While the examples are presented for an air separation system, the present invention is not intended to be limited to binary air separation. The principles of the present invention can be applied to any separation, purification and recovery system.

We claim:

1. A low void pressure swing adsorption system comprised of
   (a) at least one hermetically sealed vessel containing an adsorbent bed with at least one inlet coupled to the adsorbent bed by way of an inlet header and at least one outlet coupled to the adsorbent bed by way of an outlet header;
   (b) wherein the inlet header and the outlet header of each vessel have a combined volume of less than 10% of the volume of the adsorbent bed of said vessel; and,
   (c) wherein each inlet is coupled with at least one pressure source.

2. The low void pressure swing adsorption system of claim 1, wherein the inlet header and the outlet header of said vessel have a combined volume of less than 5% of the volume of the adsorbent bed of said vessel.

3. The low void pressure swing adsorption system of claim 1, wherein said adsorbent bed is selected from the group consisting of flat header beds, segmented beds, and vertical beds.

4. The low void pressure swing adsorption system of claim 1, wherein said at least one pressure source is a high pressure source.

5. The low void pressure swing adsorption system of claim 1, wherein said at least one pressure source is a low pressure sink.

6. A low void pressure swing adsorption system comprised of
   (a) at least one hermetically sealed vessel containing an adsorbent bed with at least two inlets coupled to the adsorbent bed by way of an inlet header and at least one outlet coupled to the adsorbent bed by way of an outlet header;
   (b) wherein the inlet header and the outlet header of each vessel have a combined volume of less than 50% of the volume of the adsorbent bed of said vessel;
   (c) wherein each inlet has a valve mounted proximate to said vessel; and,
   (d) wherein each valve shares a common pressure source.

7. The low void pressure swing adsorption system of claim 6, wherein said common pressure source is a high pressure source.

8. The low void pressure swing adsorption system of claim 6, wherein said common pressure source is a low pressure sink.

9. The low pressure swing adsorption system of claim 6, wherein the inlet header and the outlet header of each vessel have a combined volume of less than 20% of the volume of the adsorbent bed of each vessel.

10. The low void pressure swing adsorption system of claim 6, wherein said adsorbent bed is selected from the group consisting of flat header beds, segmented beds, vertical beds, and radial beds.

11. The low void pressure swing adsorption system of claim 6, wherein distribution pipes connect said valves to said common pressure source.

12. The low void pressure swing adsorption system of claim 11, wherein said inlets share said high pressure source connected to said valve and said distribution pipes are maintained at high pressure.

13. The low void pressure swing adsorption system of claim 11, wherein said inlets share said low pressure sink connected to said valve and said distribution pipes are maintained at low pressure.

14. The low void pressure swing adsorption system of claim 11, said distribution pipes have a total volume of less than 10% of the total volume of the absorbent beds.

15. The low void pressure swing adsorption system of claim 6, wherein intermediary volumes are located between the pressure source and the inlet having a total volume less than 15% of the total volume of the adsorbent beds.

* * * * *